US009161319B2

(12) United States Patent
Cheng et al.

(10) Patent No.: US 9,161,319 B2
(45) Date of Patent: Oct. 13, 2015

(54) RESOURCE ALLOCATION METHOD AND APPARATUS FOR WIRELESS COMMUNICATION SYSTEM

(75) Inventors: Shan Cheng, Suwon-si (KR); Joon Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 921 days.

(21) Appl. No.: 13/292,445

(22) Filed: Nov. 9, 2011

(65) Prior Publication Data

US 2012/0113920 A1    May 10, 2012

Related U.S. Application Data

(60) Provisional application No. 61/411,602, filed on Nov. 9, 2010.

(30) Foreign Application Priority Data

Oct. 21, 2011    (KR) ........................ 10-2011-0107783

(51) Int. Cl.
| | | |
|---|---|---|
| H04W 72/04 | (2009.01) | |
| H04W 52/32 | (2009.01) | |
| H04J 1/16 | (2006.01) | |
| H04L 5/00 | (2006.01) | |
| H04W 52/34 | (2009.01) | |

(52) U.S. Cl.
CPC ............ H04W 52/325 (2013.01); H04W 72/04 (2013.01); *H04L 5/0073* (2013.01); *H04W 52/346* (2013.01); *Y02B 60/50* (2013.01)

(58) Field of Classification Search
CPC .............................. H04W 72/04; H04L 5/0073
USPC .......................................... 370/252, 430, 329
See application file for complete search history.

(56) References Cited

U.S. PATENT DOCUMENTS

| | | | | |
|---|---|---|---|---|
| 2011/0171985 | A1* | 7/2011 | Papasakellariou et al. ... | 455/509 |
| 2011/0275394 | A1* | 11/2011 | Song et al. ..................... | 455/509 |
| 2012/0113961 | A1* | 5/2012 | Krishnamurthy ............. | 370/332 |

* cited by examiner

*Primary Examiner* — John Pezzlo
(74) *Attorney, Agent, or Firm* — Jefferson IP Law, LLP (57) ABSTRACT

A resource allocation method of a base station in a wireless communication system based on a radio frame including a plurality of subframes including at least one first-type subframe and at least one second-type subframe is provided. The method includes generating first-type downlink control information including resource allocation information on the first-type subframe, generating second-type downlink control information including resource allocation information on the second-type subframe, and transmitting the first-type subframe including the first-type downlink control information and the second-type downlink control information, wherein the second-type subframe is transmitted with a lower transmit power than the transmit power of the first-type subframe.

20 Claims, 6 Drawing Sheets

FIG. 1A

110 LEGACY DCI FORMAT
120 DCI FORMATION NEWLY DESIGNED FOR ABSF
130 NORMAL SUBFRAME
140 ABSF
150 RESOURCE ALLOCATED TO UE

FIG. 1B

110 LEGACY DCI FORMAT
120 DCI FORMATION NEWLY DESIGNED FOR ABSF
130 NORMAL SUBFRAME
140 ABSF
150 RESOURCE ALLOCATED TO UE

RESOURCE ALLOCATION METHOD AND APPARATUS FOR WIRELESS COMMUNICATION SYSTEM

CROSS-REFERENCE TO RELATED APPLICATIONS

This application claims the benefit under 35 U.S.C. §119 (e) of a U.S. provisional patent application filed on Nov. 9, 2010 in the United States Patent and Trademark Office and assigned Ser. No. 61/411,602, and under 35 U.S.C. §119(a) of a Korean patent application filed on Oct. 21, 2011 in the Korean Intellectual Property Office and assigned Serial No. 10-2011-0107783, the entire disclosures of which are hereby incorporated by reference.

BACKGROUND OF THE INVENTION

1. Field of the Invention

The present invention relates to a wireless communication system. More particularly, the present invention relates to a resource allocation method and an apparatus for the wireless communication system using subframe generated by dividing frequency-time resource in time domain.

2. Description of the Related Art

Generally, mobile communication systems provide subscribers with voice communication services on the move. With rapid technological advancements, the mobile communication systems can now also support high speed data communication services. However, there is a need for more sophisticated mobile communication systems to mitigate resource shortage and meet the high-speed service requirements of the subscribers.

Long Term Evolution (LTE) is a next generation broadband communication technology developed by the $3^{rd}$ Generation Partnership Project (3GPP) in order to meet such requirement. The LTE system is a technology for realizing high-speed packet-based downlink communication at up to 100 Mbps. In order to fulfill the requirements for the LTE system, discussions are being held on various aspects: one scheme for reducing the number of nodes located in a communication path by simplifying a configuration of the network, and another scheme for maximally approximating wireless protocols to wireless channels.

In the aforementioned wireless communication system, resource allocation is performed in unit of a subframe. A sub-frame includes a plurality of sub-carriers/Resource Elements (REs) across a plurality of Orthogonal Frequency Division Multiplexing (OFDM) symbols, wherein the sub-carriers can be contiguous or non-contiguous in the frequency domain, and the OFDM symbols can also be contiguous or non-contiguous in the time domain. In order to maintain generality, the following description is made under the assumption that a sub-frame consists of a plurality of contiguous sub-carriers across a plurality of contiguous OFDM symbols. The resources in a sub-frame can be further partitioned into Resource Blocks (RBs), and an RB can be assigned to one or more connected User Equipments (UEs) in a multi-user Multiple Input Multiple Output (MIMO) transmission mode.

A control channel is designed to carry the control signaling including Downlink Control Information (DCI) format for downlink resource allocation purpose. The design of control channel may vary from system to system. In 3GPP LTE Release 8, Physical Downlink Control Channel (PDCCH) consists of the first few OFDM symbols of each sub-frame. A UE looks for its DCI format in PDCCH region and, if found, reads the information therein for the present transmitted subframe. A DCI format for downlink communication includes information on RB resource allocation, Modulation and Coding Scheme (MCS), Hybrid Adaptive Repeat Request (HARQ) parameters, and the like.

A subframe can be categorized into one of a normal subframe and an Almost-Blank Sub-Frame (ABSF) subframe. In the legacy system, ABSF is designed to carry no scheduling or data to avoid interference in a situation where at least two networks are deployed in the same location or with overlapped coverage.

However, the mal-configured ABSF is likely to degrade resource utilization efficiency in the resource wireless communication system.

Therefore, a need exists for a method and an apparatus for scheduling data transmission in ABSF that is capable of reducing scheduling overhead.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for scheduling low power data transmission in an Almost-Blank Sub-Frame (ABSF).

Another aspect of the preset invention is to provide a method and an apparatus for scheduling data transmission in an ABSF that is capable of reducing scheduling overhead.

In accordance with an aspect of the present invention, a resource allocation method of a base station in a wireless communication system based on a radio frame including a plurality of subframes is provided. The method includes at least one first-type subframe and at least one second-type subframe includes generating first-type downlink control information including resource allocation information on the first-type subframe, generating second-type downlink control information including resource allocation information on the second-type subframe, and transmitting the first-type subframe including the first-type downlink control information and the second-type downlink control information, wherein the second-type subframe is transmitted with a lower transmit power than the transmit power of the first-type subframe.

In accordance with another aspect of the present invention, a resource allocation information acquisition method of a terminal in a wireless communication system based on a radio frame including a plurality of subframes is provided. The method includes at least one first-type subframe and at least one second-type subframe includes receiving a first subframe including first-type downlink control information on the first-type subframe and second-type downlink control information on the second-type subframe, and receiving and decoding the first-type and second-type subframes according to the first-type and second-type downlink control information, wherein the second-type subframe is transmitted with a lower transmit power than the transmit power of the first-type subframe.

In accordance with another aspect of the present invention, a base station for allocating resources in a wireless communication system based on a radio frame including a plurality of subframes is provided. The base station includes at least one first-type subframe and at least one second-type subframe includes a Radio Frequency (RF) unit for transmitting and receiving control signals and data to and from a terminal, and a control unit for generating first-type downlink control information including resource allocation information on the first-type subframe and second-type downlink control information including resource allocation information on the second-type subframe and for transmitting the first-type subframe including the first-type downlink control information and the second-type downlink control information, wherein the second-type subframe is transmitted with a lower transmit power than the transmit power of the first-type subframe.

In accordance with still another aspect of the present invention, a terminal for acquiring resource allocation from a base station in a wireless communication system based on a radio frame including a plurality of subframes is provided. The terminal includes at least one first-type subframe and at least one second-type subframe includes an RF unit for transmitting and receiving control signals and data to and from the base station, and a controller for receiving a first subframe including first-type downlink control information on the first-type subframe and second-type downlink control information on the second-type subframe, and for receiving and decoding the first-type and second-type subframes according to the first-type and second-type downlink control information, wherein the second-type subframe is transmitted with a lower transmit power than the transmit power of the first-type subframe.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

FIGS. 2A and 1B illustrate exemplary resource allocations in an ABSF according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the following description is directed to an Advanced Evolved Universal Mobile Telecommunications System (UMTS) Terrestrial Radio Access Network (E-UTRA) (or referred to as Long Term Evolution-Advanced (LTE-A)) supporting carrier aggregation, it is obvious to those skilled in the art that the principle of the present invention can be applied to other communication systems having the similar technical background and channel format, with a slight modification, without departing from the spirit and scope of the invention. For example, the principle of the present invention can be applied to multicarrier High Speed Packet Access (HSPA) supporting carrier aggregation.

Throughout the exemplary embodiments of the present invention, the $3^{rd}$ Generation Partnership Project (3GPP) LTE Release 8 to 10 are regarded as the legacy systems and future Releases 11 and beyond are taken as the systems where the exemplary embodiments of the present invention can be implemented. The exemplary embodiments of the present invention can also be applied to other cellular systems, such as Institute of Electrical and Electronics Engineers (IEEE) 802.16 (Worldwide Interoperability for Microwave Access (WiMax)).

Physical Downlink Control Channel (PDCCH) Structure in LTE Release 8

In 3GPP LTE Release 8, a PDCCH is presented in the first several Orthogonal Frequency Division Multiplexing (OFDM) symbols. The number of OFDM symbols used for PDCCH is indicated in another Physical Control Format Indication Channel (PCFICH) in the first OFDM symbol. Each PDCCH consists of L Control Channel Elements (CCE), where L=1,2,4,8 representing different CCE aggregation levels, and each CCE consists of 36 sub-carriers distributing throughout the transmission bandwidth.

DCI Formats Design

The Downlink Control Information (DCI) formats in LTE are designed to carry control information for the users while minimizing the payload size and complexity in implementation and testing. In general, the number of bits required for resource assignment depends on the transmission mode as well as the system bandwidth.

Time-Domain Inter Cell Interference Coordination (ICIC) among Homogeneous/Heterogeneous Networks When at least two networks are deployed in the same location or with overlapped coverage, ICIC techniques need to be taken if they are operating on the same frequency bandwidth. One of the ICIC solutions is the time-domain multiplexing, i.e., only one network/cell transmits at a time while all the other collocated networks/cells keeps muted or very low transmission power.

To maintain the normal operations and connections for legacy User Equipments (UEs), the synchronization channel, and/or common reference, and/or a few control channels need to be transmitted even when there is no data transmission in the present sub-frame. There are also multiple solutions to modify the relative sub-frame offset among the network so that the mutual interference of the aforementioned synchronization and controlling information can be minimized.

In exemplary embodiments of the present invention, a legacy frame is referenced as a normal frame (or a first-type subframe), while a frame without any data transmission or with lower-power data transmission is referenced as an Almost-Blank Sub-Frame (ABSF) (or a second-type frame). Here, an ABSF (i.e., the second-type frame) has low transmission power as compared to the normal subframe (i.e., the first-type subframe). In an exemplary embodiment of the present invention, the description is directed to the scenarios where low-power data transmission takes place in an ABSF. In the following description, the DCI indicating scheduling information in normal subframe is referenced as normal DCI formation (or first-type downlink control information), and the DCI indicating scheduling in an ABSF is referenced as ABSF-DCI (or second-type downlink control information).

In an ABSF subframe, the transmission power should be as low as possible to minimize the harmful inter-cell interference. However, a few kind of signaling (DCI) including synchronization signaling, reference signaling, and control channels carrying Hybrid Adaptive Repeat Request (HARQ) information should be guaranteed to be transmitted over a predefined transmission power level. For robust control channel protection, the DCI should be transmitted with the same transmission power level as that of a normal subframe. If this DCI is to be transmitted in the same ABSF where data transmission is scheduled, interference to the other collocated cells occurs. By taking notice of this fact, it is proposed, in exemplary embodiments of the present invention, to transmit the DCI in a normal subframe prior to the ABSF transmission.

Throughout exemplary embodiments of the present invention, it is fundamentally assumed that the system broadcasts the ABSF-DCI format to the UEs scheduled in the ABSF before the ABSF transmission. Such a broadcast could be carried via a special downlink control indication or via higher layer signaling, while the detail design is beyond the scope of the present invention. In summary, it is assumed that a UE is aware of the ABSF scheduling pattern in advance. Here, the ABSF scheduling pattern is a rule for arranging normal subframes and ABSFs in one radio frame. In a case where one subframe consists of 10 subframes including normal subframes and/or ABSFs, the ABSF scheduling pattern can be defined with the arrangement order and numbers of normal subframes and ABSFs.

Effective Range of ABSF Scheduling Indication

When scheduled, ABSF could occupy one or several of the subframes in a radio frame. In this case, UEs should know ABSF pattern in advance.

The DCI formats for downlink scheduling are transmitted in the PDCCH region of a normal subframe. The DCI signaling are UE-specific and each UE should try to find and decode its own DCI formats within the PDCCH region by blind decoding. In exemplary embodiments of the present invention, one can consider whether to reuse the normal DCI formation for ABSF-DCI format or to newly define ABSF-DCI format.

In an exemplary embodiment of the present invention, two alternative solutions are proposed for implementing ABSF-DCI formats as follows.

A. To define new DCI (ABSF-DCI) format for notifying the UE of only the scheduling information in an ABSF.
In this solution, legacy DCI format for the present subframe and a new DCI format for indicating scheduling information in an ABSF are transmitted separately (e.g., in parallel).

B. A new category of DCI formats that indicates both data transmission information in the present normal subframe as well as that in ABSF. To define new DCI format indicating scheduling in an ABSF and normal subframe simultaneously.
In this solution, the legacy DCI format information is a subset of new DCI formation information. New fields for an ABSF scheduling are added on top of the legacy DCI format to form a new DCI format.

In an exemplary embodiment of the present invention, a description is made of the exemplary method introduced in section A. That is, the ABSF-DCI formation is defined in separation from the legacy DCI formats. Simultaneously, the legacy DCI formation for indicating scheduling information in the normal subframe and the new ABSF-DCI format indicating the scheduling information in legacy normal DCI formation and ABSF are transmitted to the UE independently in normal subframes. However, exemplary embodiments of the present invention are not limited to the solution A and can be applied to the solution B.

In this case, it is needed to determine a number of ABSFs of which scheduling information is indicated by the ABSF-DCI format transmitted in the normal subframe among the ABSFs included in the radio subframe. A description is made of the effective rage of scheduling indicated by ABSF-DCI with reference to FIGS. 1A and 1B.

FIGS. 1A through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1A:
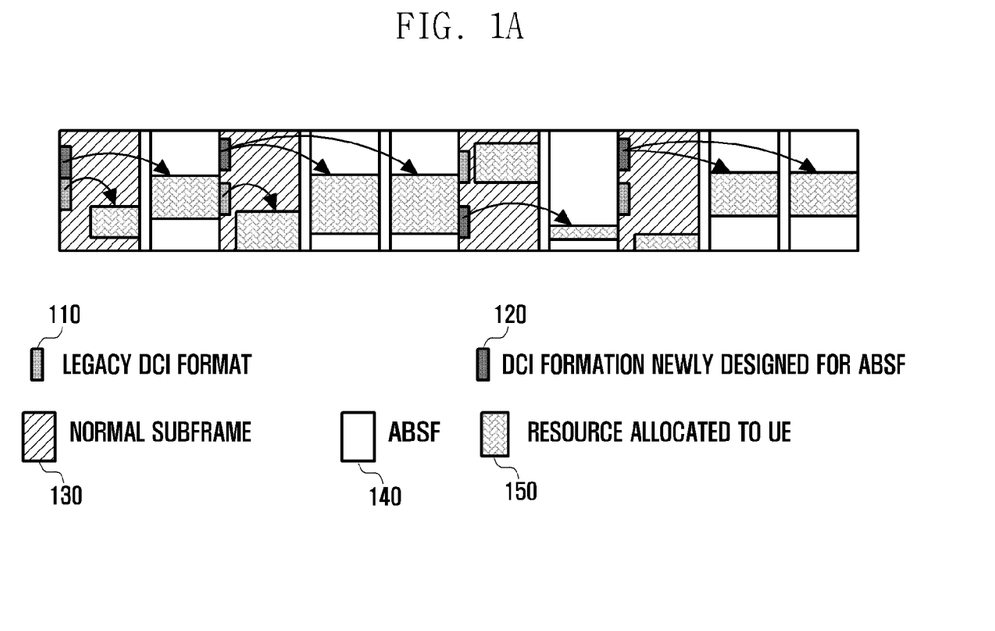
FIGS. 1A and 1B illustrate effective ranges of scheduling information indicated by an Almost-Blank Sub-Frame-Downlink Control Information (ABSF-DCI) format according to exemplary embodiments of the present invention.
Figure 1B:
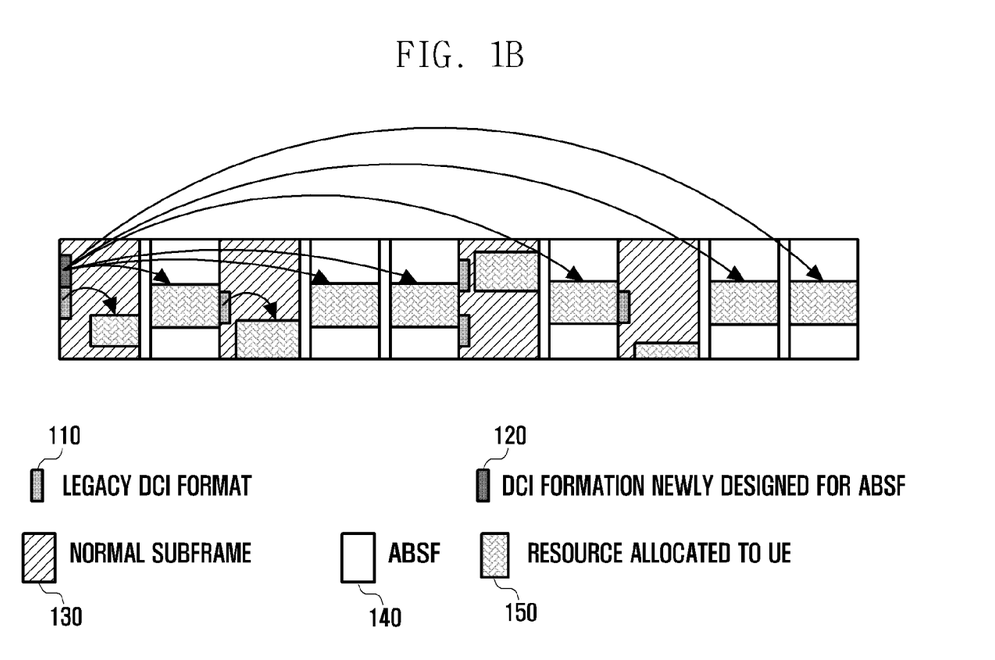

FIGS. 1A and 1B illustrate effective ranges of scheduling information indicated by ABSF-DCI format according to exemplary embodiments of the present invention.

Referring to FIGS. 1A and 1B, ABSF patterns in a radio frame consisted of 10 subframes of which 6 subframes are ABSFs are provided. Throughout the description, it is assumed that a radio frame consists of ten subframes indexed from 0 to 9.

The ABSF pattern is configured with normal subframes 130 indexed by 0, 2, 5, and 7 and ABSFs 140 indexed by 1, 3, 4, 8, and 9.

The normal DCI formation 110 indicates the scheduling information for the normal subframes 130 and the ABSF-DCI format 120 indicates the scheduling information for the ABSFs 140. The normal DCI format 110 and ABSF-DCI format 120 indicate the resource 150 allocated in the normal subframe 130 and ABSF 140 respectively.

1-1. ABSF-DCI Scheduling Indication Effective Range Exemplary Embodiment 0

Referring to FIG. 1A, four ABSF-DCI formats are transmitted in four normal subframes. The scheduling information included in the ABSF-DCI format is effective to the ABSF until the next normal subframe following the normal subframe carrying the ABSF-DCI.

The scheduling information included in the ABSF-DCI transmitted in the normal subframe 0 is valid for the ABSF 1, and the scheduling information included in the ABSF-DCI transmitted in the normal subframe 2 is valid for the ABSF 3 and ABSF 4. Similarly, the scheduling information included in the normal subframe 5 is valid for the ABSF 6, and the scheduling information included in the ABSF-DCI transmitted in the normal subframe 7 is valid for the ABSF 8 and ABSF 9.

1-2. ABSF-DCI Scheduling Indication Effective Range Exemplary Embodiment 1

Referring to FIG. 1B, only one ABSF-DCI formation is transmitted. The scheduling information included in one ABSF-DCI format transmitted in a normal subframe is valid for all of the ABSFs included in the radio frame.

The scheduling information included in the ABSF-DCI formation transmitted in the normal subframe 0 is valid for all of the ABSFs 1, 3, 4, 6, 8, and 9 within the radio frame. In all ABSFs, the UE follows the same scheduling information including resource allocation, Modulation and Coding Scheme (MCS), and the like.

Figure 2A:
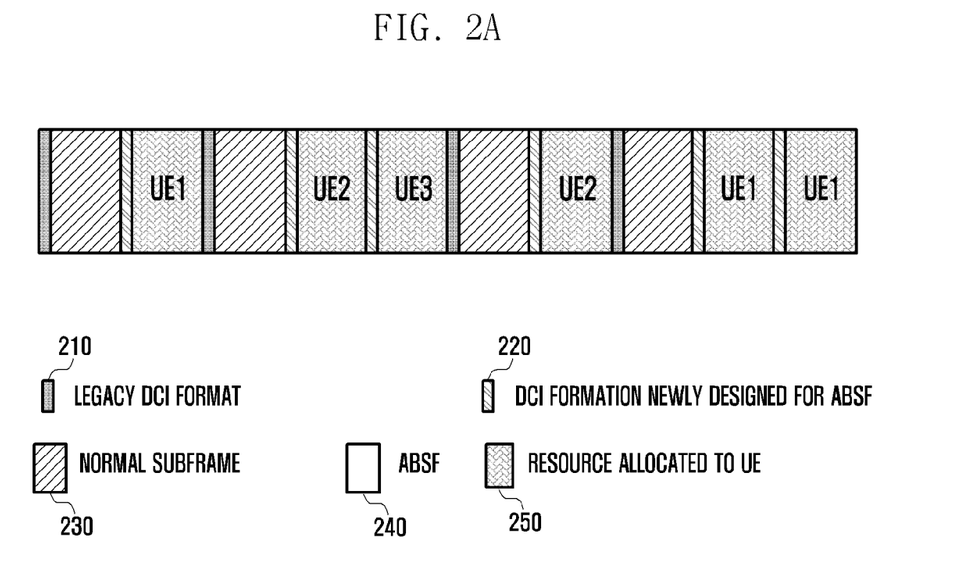
Figure 2B:
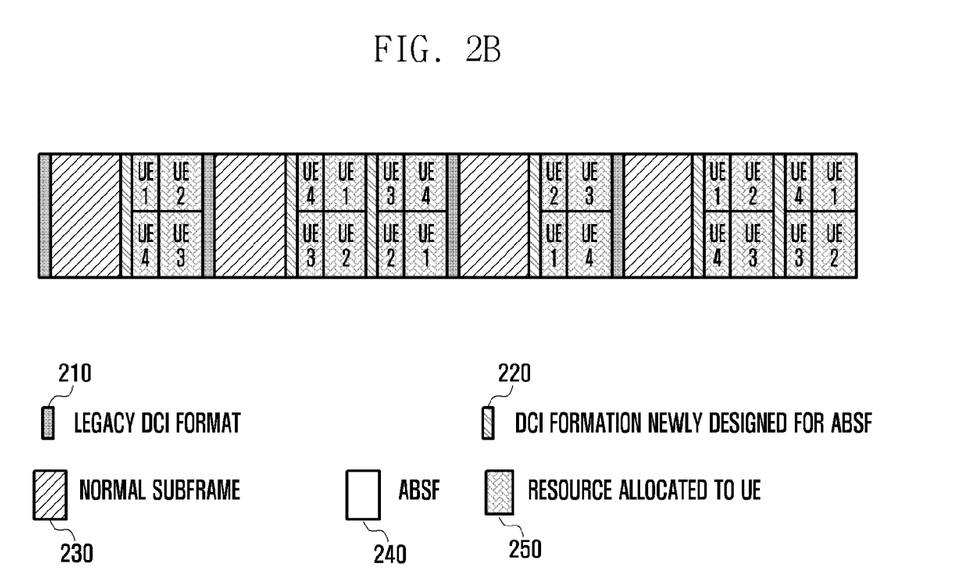

FIGS. 2A and 2B illustrate exemplary resource allocations in an ABSF according to exemplary embodiments of the present invention.

2-1. UE Resource Allocation Exemplary Embodiment 0

Similar to what has been described above on ABSF-DCI effective range, the resource allocation is common for all ABSF within the radio frame. A UE assumes the same resource allocation for all ABSFs within the radio frame range as indicated in the previous normal subframe.

Given the fact that there could be very limited number of connected UEs that can be scheduled in an ABSF, it is preferable that the granularity of resource allocation should be much larger than a Resource Block (RB) to save overhead. According to the UE resource allocation exemplary embodiment 0 of the present invention, the resources in an ABSF are partitioned into limited number of resource groups, and each resource group is assigned to one UE within a radio frame.

2-2. UE Resource Allocation Exemplary Embodiment 1

According to the UE resource allocation exemplary embodiment 1, the resources in an ABSF can be allocated to only one UE. That is, in a certain ABSF, only one UE can be assigned the resources. In an exemplary implementation, a UE can be assigned the resources in plural ABSFs.

A bitmap field can be defined in the ABSF-DCI for indicating ABSF of which resource is assigned. For example, if 6 ABSFs are included in the radio frame, 6 bits in the ABSF-DCI is used for indicating the ABSFs assigned for the current UE among the 6 ABSFs. The length of this field can vary or be fixed to 10 or a value corresponding to the number of maximum ABSFs available in the radio frame depending on the ABSF configuration of the system.

Referring to FIG. 2A, subframes 1, 3, 4, 6, 8, and 9 are configured as ABSFs 240. The ABSFs 1, 8, and 9 are assigned to the UE 1, the ABSFs 3 and 6 to UE 2, and ABSF 4 to UE 3. The 6-bit bitmap is enough for indicating allocated resource 250 in each ABSF-DCI format 220.

The normal DCI formation 210 indicates the scheduling information for the normal subframes 230 and the ABSF-DCI format 220 indicates the scheduling information for the ABSFs 240. The normal DCI format 210 and ABSF-DCI format 220 indicate the resource 250 allocated in the normal subframe 230 and ABSF 240 respectively.

2-3. UE Resource Allocation Exemplary Embodiment 2

In the UE resource allocation exemplary embodiment 1, the granularity of resource allocation for an UE is a complete ABSF. It is also possible to reduce the granularity so that the resource allocation can be more flexible.

In an exemplary implementation, the resources in an ABSF are partitioned into limited number of bulky resource groups as introduced in UE resource allocation embodiment 0. The system can predefine one or multiple such resource partitions or partition patterns. If there is only one possible partitioning, no information is needed for partitioning indication. If there are multiple resource partitioning options, a field needs to be present in the ABSF-DCI to indicate which resource portioning is taken.

The system also predefines one or multiple resource partitions and one or multiple hopping patterns. UEs switch the resource group from one ABSF to another ABSF according to the predefined pattern.

Referring to FIG. 2B, an ABSF is partitioned into four resource groups and assigned to four UEs. The UE changes its allocated resource group in next ABSF according to a predefined hopping pattern. Simple rotating rule is applied in the drawing for those four UEs to rotate their assigned resource groups.

3. MCS for ABSF

An MCS level for a particular UE is determined by its link quality. When the Signal-to-Noise Ratio (SNR) is high, the UE can communicate with an evolved Node B (eNB) with high data rate using higher coding rate and higher-order modulations. When the SNR is low, the UE should communicate with an eNB with low data rate using lower coding rate and lower-order modulations.

When data is transmitted in an ABSF, the transmission power is assumed to be much lower than that of a normal frame. The power of ABSF could be broadcasted via another control signaling or via higher layer signaling when needed. The format of such power level broadcasting could be absolute power level or relative power offset comparing to the normal sub-frame.

Since the power level of ABSFs is different from that of normal subframes 230, the MCS level of ABSFs also changes accordingly. In the system of the related art, such as 3GPP release 8-10, a 5-bit field is included in DCI format to define MCS level for each codeword. It is possible for an ABSF-DCI to reuse the same MCS definition for ABSF, and the MCS level is applied to those ABSFs as introduced in the effective range section.

However, given the special properties of the ABSF, there are a few other alternatives to define the MCS level other than the legacy approach to save more overheads.

3-1. MCS Indication Exemplary Embodiment 0

The ABSF MCS level can be fixed as one of the most robust MCS level even though higher data-rate transmission is possible. For example, the system can mandate the MCS=1 for all ABSFs. In this exemplary embodiment, no MCS indication is needed for the ABSF.

3-2. MCS Indication Exemplary Embodiment 1

The ABSF MCS level can be one of the robust MCS levels depending on the UE's latest wideband Channel Quality Indicator (CQI) feedback. The transmitted MCS level is not necessarily on the same level of the CQI feedback, and should be much more robust given the lower transmit power of the ABSF.

3-3. MCS Indication Exemplary Embodiment 2

The ABSF MCS level can be chosen from one of the most robust MCS levels. For example, the system uses 2 bits to indicate the MCS level 1, 2, 3, 4, and it is also possible for the system to use 2 bits to represent MCS level 1, 3, 5, 7.

3-4. MCS Indication Exemplary Embodiment 3

The ABSF MCS level is indicated as a differential value from the MCS level of a normal frame, if the MCS level for normal frame is available.

3-5. MCS Indication Exemplary Embodiment 4

The ABSF MCS level is explicitly derived from the MCS level of normal subframe as well as the power level of the ABSF, if both are available.

If the ABSF power level is quantized to a limited number of levels, the system can use a mapping table (MCSNORMAL, PABSF)→MCSABSF to obtain the ABSF MCS level. Table 1 illustrates an exemplary mapping rule, where the first column represents values of MCSNORMAL and the first row represents ABSF power offset values from normal frame. Four levels of possible ABSF are assumed. The main body of the table indicates the MCSABSF value, where "NA" means ABSF data transmission is not possible.

TABLE 1

|    | −3 dB | −6 dB | −9 dB | −12 dB |
|----|-------|-------|-------|--------|
| 0  | NA    | NA    | NA    | NA     |
| 1  | NA    | NA    | NA    | NA     |
| 2  | 1     | NA    | NA    | NA     |
| 3  | 1     | NA    | NA    | NA     |
| 4  | 1     | 2     | NA    | NA     |
| ...| ...   | ...   | ...   | ...    |
| 29 | 20    | 10    | 6     | 1      |
| 30 | 22    | 12    | 6     | 2      |
| 31 | 24    | 14    | 8     | 4      |

It should be noted that the values in Table 1 are only presented as an example and the detailed values depends on specific communication systems.

In another exemplary implementation, the ABSF MCS can also be written down as a function of $MCS_{NORMAL}$ and $P_{ABSF}$, i.e., $MCS_{ABSF}=f(MCS_{NORMAL}, P_{ABSF})$.

In still another exemplary implementation, more parameters can be taken into account or as a replacement of $MCS_{NORMAL}$ when it is not available for the present frame/subframe for $MCS_{ABSF}$ calculation. These parameters should be known to both the eNB and the UE. One of the candidates could be the last wideband CQI feedback from the UE. The equation can be expressed as $MCS_{ABSF}=f(CQI_{WB}, MCS_{NORMAL}, P_{ABSF})$ or $MCS_{ABSF}=f(CQI_{WB}, P_{ABSF})$ especially when $MCS_{NORMAL}$ value is not available.

MCS Indication for Multiple Codewords Transmission

When there are multiple CodeWords (CWs) in a normal frame and/or an ABSF, assumptions need to be taken for clarification for MCS indication for those exemplary embodiments (i.e., MCS indication exemplary embodiments 3 and 4) depending on the MCS level of normal subframes. There can be alternative ways of defining the reference MCS level when there are two MCS values for normal sub-frames. Table 2 shows exemplary alternatives for each case.

TABLE 2

|              | Normal subframe (1CW)       | Normal subframe (2CW)                                                                                                            |
|--------------|-----------------------------|----------------------------------------------------------------------------------------------------------------------------------|
| ABSF (1CW)   | $MCS_{CW1}$ as reference    | Alt. 1: mandate reference as CW1; Alt. 2: mandate reference as $\min(MCS_{CW1}, MCS_{CW2})$                                      |
| ABSF (2CW)   | $MCS_{CW1}$ as reference    | Alt. 1: $MCS_{CW1}$ as the reference of ABSF-$MCS_{CW1}$ and $MCS_{CW2}$ as the reference of ABSF-$MCS_{CW2}$ Alt. 2: mandate reference as $\min(MCS_{CW1}, MCS_{CW2})$ |

Figure 3:
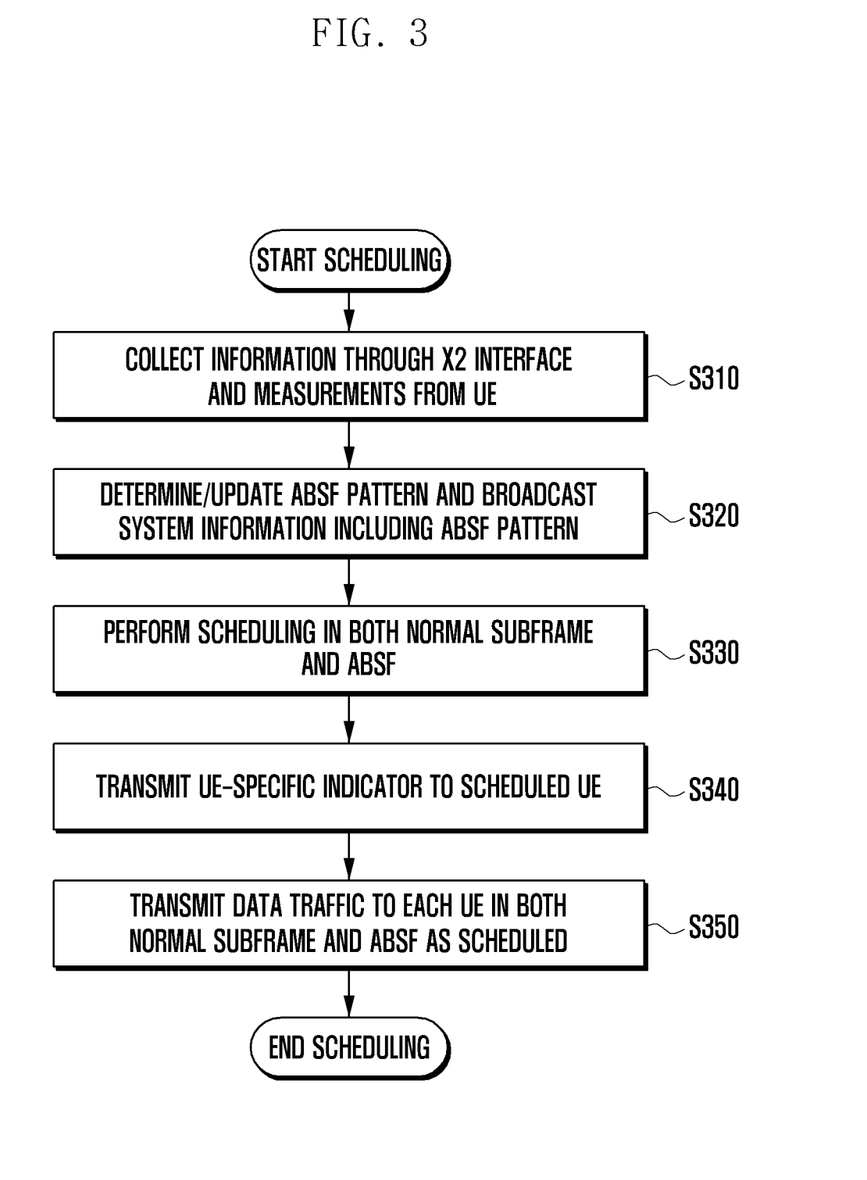
FIG. 3 is a flowchart illustrating an evolved Node B (eNB) procedure for scheduling according to an exemplary embodiment of the present invention.

FIG. 3 is a flowchart illustrating an eNB procedure for scheduling according to an exemplary embodiment of the present invention.

Referring to FIG. 3, the eNB collects measurement information needed for scheduling UE and information obtained by reflecting interference with neighbor cells and scheduling state through X2 interface at step S310. Thereafter, the eNB determines whether to use ABSF based on the collected information at step S320. If it is determined to use ABSF, the eNB determines an ABSF pattern to be used and broadcast system information including the ABSF pattern.

At step S330, the eNB performs scheduling in normal subframes and ABSF. At this time, if there is any UE to be scheduled in the ABSF, the eNB generates a normal DCI format and ABSF-DCI formation for resource allocation and for indicating other transmission properties for the scheduled UEs.

In this case, the effective range of the scheduling information included in the ABSF-DCI formation and the resource allocation granularity for ABSF can be determined according to one of the above exemplary embodiments.

At step S340, the eNB transmits a normal subframe including both the normal DCI format and ABSF-DCI format. Thereafter, the eNB transmits data traffic in the normal subframe and ABSF according to the scheduling information included in the normal DCI format and ABSF-DCI format at step S350.

Figure 4:
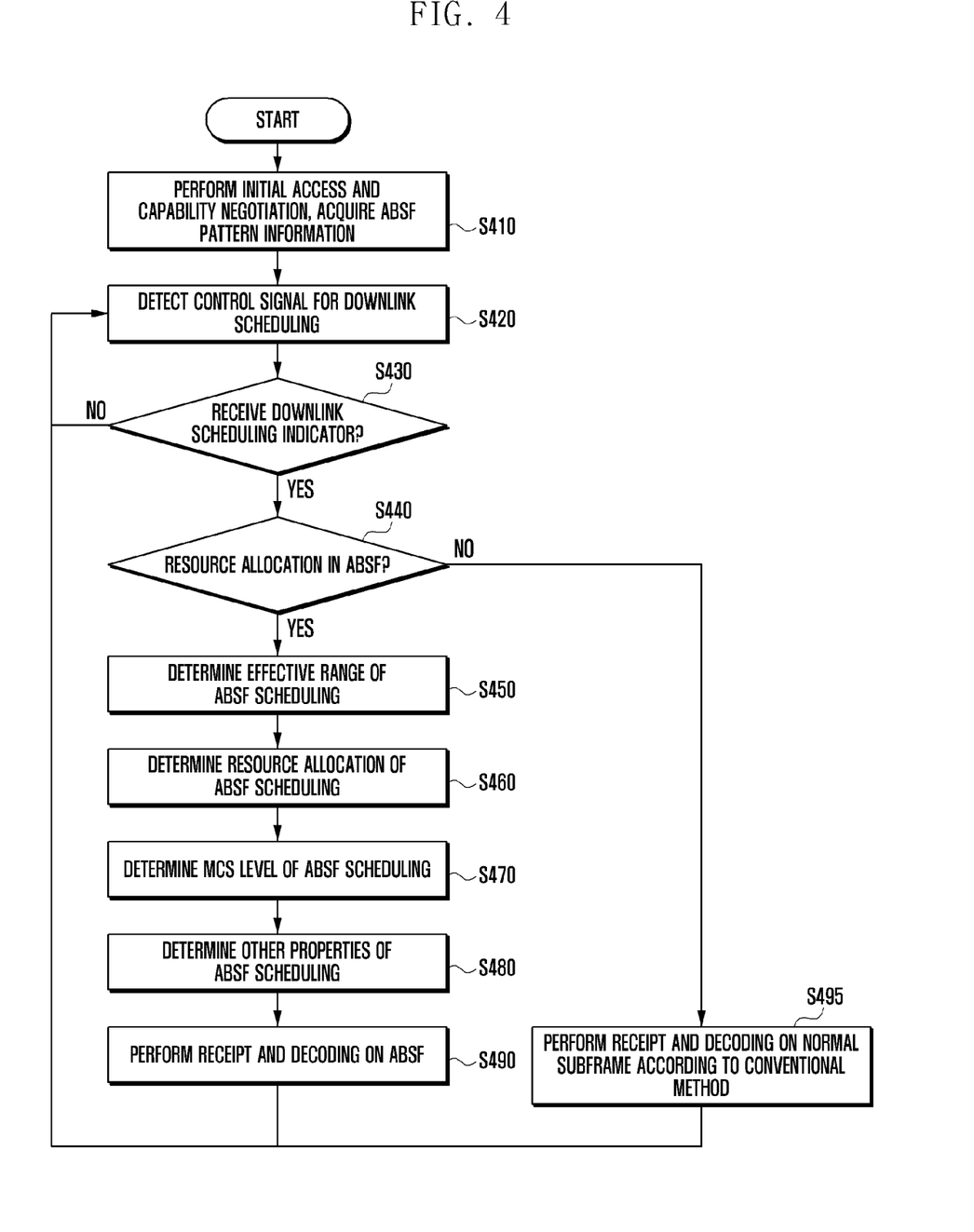
FIG. 4 is a flowchart illustrating a User Equipment (UE) procedure for scheduling according to an exemplary embodiment of the present invention.

FIG. 4 is a flowchart illustrating a UE procedure for scheduling according to an exemplary embodiment of the present invention.

Referring to FIG. 4, the UE first performs initial access and capability negotiation process with an eNB at step S410. In the negotiation process, the UE recognizes that the access network supports ABSF and acquires information on the ABSF pattern through higher layer signaling.

At step S420, the UE monitors control signaling to acquire downlink scheduling information. If ABSF is configured, the UE can monitor PDCCH to detect the normal DCI format for normal subframe transmission and ABSF-DCI formation.

At step S430, the UE determines whether the downlink scheduling information is acquired and, if acquired, the procedure goes to step S440. At step S440, the UE determines whether there is resource allocation in ABSF based on whether ABSF-DCI formation is detected while decoding downlink scheduling information. If there is no resource allocation in ABSF, the UE performs receipt and decoding on the normal subframe in the process of the related art at step S495.

In contrast, if there is resource allocation in ABSF, the UE determines the effective range of the corresponding ABSF scheduling information at step S450. The effective range of the ABSF scheduling information can be determined according to one of the above exemplary embodiments.

At step S460, the UE acquires the information on the resource allocation scheme for ABSF. Since the resource allocation scheme can be determined according to one of the above exemplary embodiments, detailed description thereon is omitted herein.

The UE determines MCS level of ABSF scheduling at step S470 and determines other properties for ABSF scheduling (e.g., HARQ parameter, and the like) at step S480.

After acquiring the scheduling information for ABSF in the ABSF-DCI format, the UE performs receipt and decoding on the downlink data in the ABSF according to the acquired transmission properties at step S490.

Figure 5:
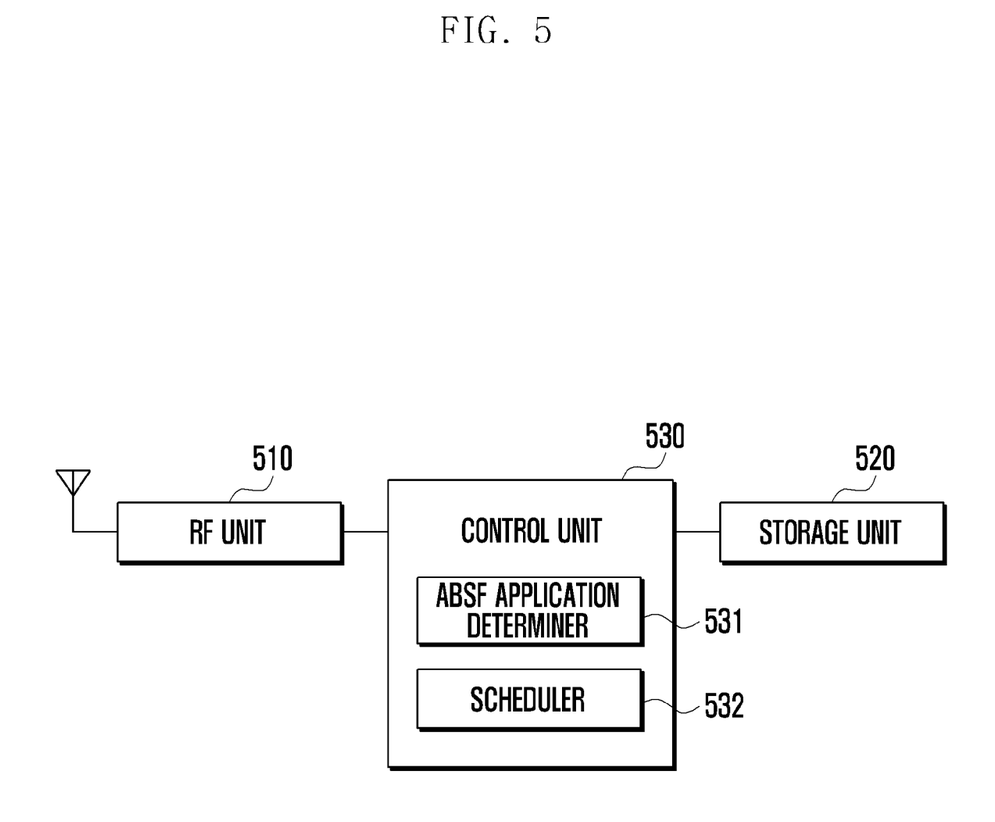
FIG. 5 is a block diagram illustrating a configuration of an eNB according to an exemplary embodiment of the present invention.

FIG. 5 is a block diagram illustrating a configuration of an eNB according to an exemplary embodiment of the present invention.

Referring to FIG. 5, the eNB includes a Radio Frequency (RF) unit 510, a storage unit 520, and a control unit 530.

The RF unit 510 is responsible for transmitting and receiving control signals and data to and from a UE. The RF unit 510 includes an RF transmitter for up-converting and amplifying the signal to be transmitted and an RF receiver for low noise amplifying and down-converting the received signal. The RF unit 510 delivers the data received through a radio channel to the control unit 530 and transmits the data output by the control unit 530 through the radio channel. According to an exemplary embodiment of the present invention, the control signal transmitted from an eNB to a UE includes downlink control information including resource allocation information, ABSF capability, and ABSF pattern transmitted through higher layer signaling.

The storage unit 520 can store the programs and data related to the operations of the eNB according to an exemplary embodiment of the present invention. The storage unit 520 can store UE scheduling-related information acquired from neighbor cells and/or UEs and use this information for resource allocation to UEs.

The control unit 530 controls signaling among internal function blocks in association with the operations of the eNB according to an exemplary embodiment of the present invention. More specifically, the control unit 530 generates a normal subframe including both the normal DCI format including information on the resource allocation in normal subframes and ABSF-DCI format including information on the resource allocation in ABSFs. Here, the effective range of the scheduling indicator included in ABSF-DCI format and resource allocation granulaity for ABSF can be determined according to one of the above described exemplary embodiments. The control unit 530 controls the transmission of the normal DCI format and ABSF-DCI format to the UE in normal subframes.

According to an exemplary embodiment of the present invention, the control unit 530 includes an ABSF application determiner 531 and a scheduler 532.

The ABSF application determiner 531 collects the measurement information transmitted by UEs for UE scheduling and inter-cell interference and scheduling state information. The ABSF application determiner 531 determines whether to apply ABSF function to the system based on the collected information. If it is determined to apply ABSF function, the ABSF application determiner 531 determines the ABSF pattern to be used in the system and broadcast the system information including the ABSF pattern information.

If it is determined to apply ABSF function, the scheduler 532 performs resource allocation in the normal subframes and ABSFs. The scheduler 532 generates a normal DCI format including the information on the resource allocation in normal subframes and ABSF-DCI format including information on the resource allocation in ABSFs. The scheduler controls the transmission of the normal frame including the normal DCI format and ABSF-DCI formation to the UE.

Figure 6:
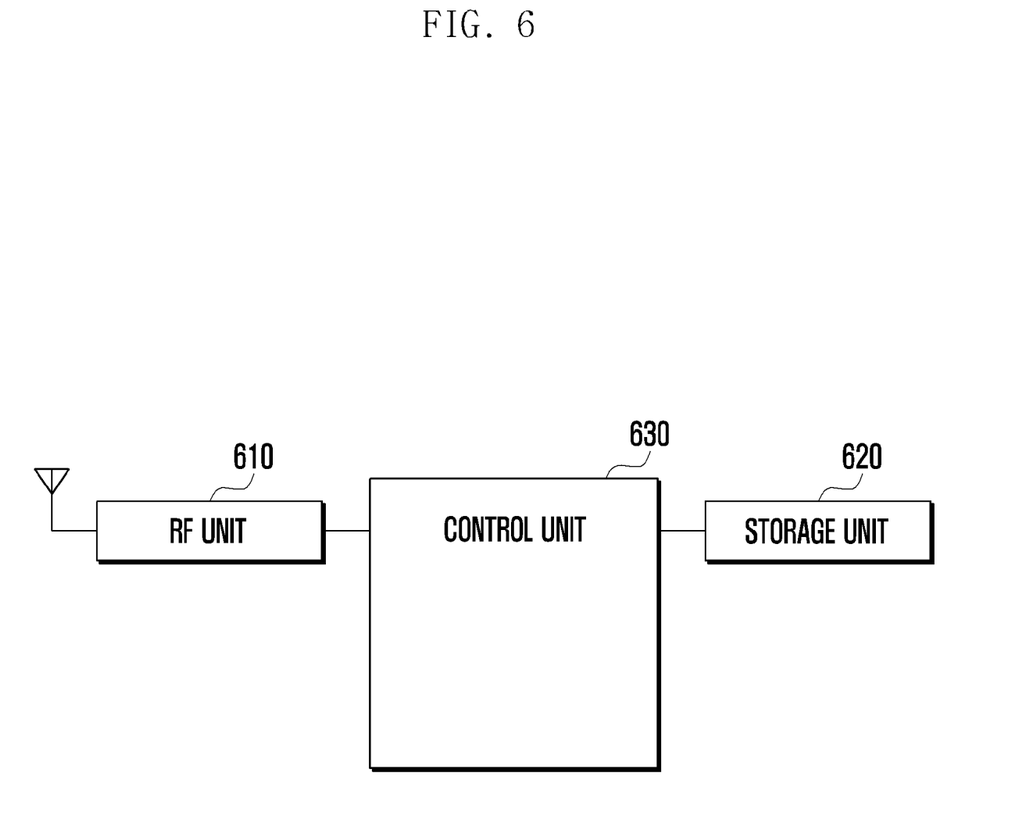
FIG. 6 is a block diagram illustrating a configuration of a UE according to an exemplary embodiment of the present invention.

FIG. 6 is a block diagram illustrating a configuration of an UE according to an exemplary embodiment of the present invention.

Referring to FIG. 6, the UE includes an RF unit 610, a storage unit 620, and a control unit 630.

The RF unit 610 is responsible for transmitting and receiving control signals and data to and from an eNB. The RF unit 610 includes an RF transmitter for up-converting and amplifying the signal to be transmitted and an RF receiver for low noise amplifying and down-converting the received signal. The RF unit 610 delivers the data received through a radio channel to the control unit 630 and transmits the data output by the control unit 630 through the radio channel.

The storage unit 620 can store the programs and data related to the operations of the UE according to an exemplary embodiment of the present invention.

The control unit 630 controls signaling among internal function blocks in association with the operations of the UE. More specifically, the control unit 630 controls the reception of a normal subframe including both the normal DCI format including information on the resource allocation in normal subframes and ABSF-DCI format including information on the resource allocation in ABSFs. The control unit 630 controls the reception and decoding of the normal subframes and ABSFs according to the received normal DCI format and ABSF-DCI format.

As described above, the resource allocation method and an apparatus of exemplary embodiments of the present invention schedules low power data transmission in an ABSF so as to improve resource utilization efficiency in a resource limited system as compared to the resource allocation methods of the related art. In addition, the resource allocation method and apparatus of exemplary embodiments of the present invention are capable of reducing DCI size for scheduling in ABSF, resulting in reduction of ABSF scheduling overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A resource allocation method of a base station in a wireless communication system based on a radio frame including a plurality of subframes including at least one first-type subframe and at least one second-type subframe, the method comprising:

generating first-type downlink control information including resource allocation information on the first-type subframe;

generating second-type downlink control information including resource allocation information on the second-type subframe; and transmitting the first-type subframe including the first-type downlink control information and the second-type downlink control information, wherein the second-type subframe is transmitted with a lower transmit power than the transmit power of the first-type subframe.

2. The method of claim 1, wherein the second-type downlink control information is valid for the second-type subframe included before the first-type subframe following the first-type subframe carrying the second-type downlink control information.

3. The method of claim 1, wherein the second-type subframe is partitioned into a plurality of resource groups, and wherein each resource group is allocated to one terminal in a radio frame.

4. The method of claim 2, wherein the second-type subframe includes resources allocated to only one terminal.

5. The method of claim 1, wherein the second-type downlink control information is valid for all second-type subframes included in a radio frame.

6. A resource allocation information acquisition method of a terminal in a wireless communication system based on a radio frame including a plurality of subframes including at least one first-type subframe and at least one second-type subframe, the method comprising:

receiving a first subframe including first-type downlink control information on the first-type subframe and second-type downlink control information on the second-type subframe; and receiving and decoding the first-type and second-type subframes according to the first-type and second-type downlink control information, wherein the second-type subframe is transmitted with a lower transmit power than the transmit power of the first-type subframe.

7. The method of claim 6, wherein the second-type downlink control information is valid for the second-type subframe included before the first-type subframe following the first-type subframe carrying the second-type downlink control information.

8. The method of claim 6, wherein the second-type downlink control information is valid for all second-type subframes included in a radio frame.

9. The method of claim 6, wherein the second-type subframe is partitioned into a plurality of resource groups, and wherein each resource group is allocated to one terminal in a radio frame.

10. The method of claim 6, wherein the second-type subframe includes resources allocated to only one terminal.

11. A base station for allocating resources in a wireless communication system based on a radio frame including a plurality of subframes including at least one first-type subframe and at least one second-type subframe, the base station comprising:

a Radio Frequency (RF) unit for transmitting and receiving control signals and data to and from a terminal; and a control unit for generating first-type downlink control information including resource allocation information on the first-type subframe and second-type downlink control information including resource allocation information on the second-type subframe and for transmitting the first-type subframe including the first-type downlink control information and the second-type downlink control information, wherein the second-type subframe is transmitted with a lower transmit power than the transmit power of the first-type subframe.

12. The base station of claim 11, wherein the second-type downlink control information is valid for the second-type subframe included before the first-type subframe following the first-type subframe carrying the second-type downlink control information.

13. The base station of claim 11, wherein the second-type downlink control information is valid for all second-type subframes included in a radio frame.

14. The base station of claim 11, wherein the second-type subframe is partitioned into a plurality of resource groups, and wherein each resource group is allocated to one terminal in a radio frame.

15. The base station of claim 11, wherein the second-type subframe includes resources allocated to only one terminal.

16. A terminal for acquiring resource allocation from a base station in a wireless communication system based on a radio frame including a plurality of subframes including at least one first-type subframe and at least one second-type subframe, the terminal comprising:

a Radio Frequency (RF) unit for transmitting and receiving control signals and data to and from the base station; and a controller for receiving a first subframe including first-type downlink control information on the first-type subframe and second-type downlink control information on the second-type subframe, and for receiving and decoding the first-type and second-type subframes according to the first-type and second-type downlink control information, wherein the second-type subframe is transmitted with a lower transmit power than the transmit power of the first-type subframe.

17. The terminal of claim 16, wherein the second-type downlink control information is valid for the second-type subframe included before the first-type subframe following the first-type subframe carrying the second-type downlink control information.

18. The terminal of claim 16, wherein the second-type downlink control information is valid for all second-type subframes included in a radio frame.

19. The terminal of claim 16, wherein the second-type subframe is partitioned into a plurality of resource groups, and wherein each resource group is allocated to one terminal in a radio frame.

20. The terminal of claim 16, wherein the second-type subframe includes resources allocated to only one terminal.

* * * * *